J. ROSEMEYER.
SPRING ARRANGEMENT FOR VEHICLES.
APPLICATION FILED OCT. 23, 1908.

958,544.

Patented May 17, 1910.
2 SHEETS—SHEET 1.

Witnesses:
W. P. Burke
A. F. Heuman.

Inventor:
Julius Rosemeyer
By
[signature]
Atty.

J. ROSEMEYER.
SPRING ARRANGEMENT FOR VEHICLES.
APPLICATION FILED OCT. 23, 1908.

958,544.

Patented May 17, 1910.

UNITED STATES PATENT OFFICE.

JULIUS ROSEMEYER, OF BERLIN, GERMANY.

SPRING ARRANGEMENT FOR VEHICLES.

958,544.  Specification of Letters Patent.  Patented May 17, 1910.

Application filed October 23, 1908. Serial No. 459,196.

*To all whom it may concern:*

Be it known that I, JULIUS ROSEMEYER, engineer, a citizen of the German Empire, residing at Berlin, N. W. Kirchweg 18, Germany, have invented certain new and useful Improvements in a Spring Arrangement for Vehicles, of which the following is a specification.

The invention has relation to vehicle springs, especially on automobiles, and consists in a special arrangement of springs, by means of which a suppression of the swaying of the springs is attained.

It is known that on driving an automobile with a light load over very uneven roads, the body of the automobile sways or springs, which is very disagreeable for the occupants of the carriage. For remedying this nuisance, so-called buffing-apparatuses of various constructions have already been provided, but for the most part they work very defectively, or they have a very complicated sort of construction, the cost of which is too expensive. The same purpose is attained in an exceedingly simple manner by the present invention insomuch as the real bearing-spring is connected in such a manner to a suppression-spring by means of movable arms situated on the frame-support, that, on the bearing-spring extending, the suppression-spring is compressed. Both these springs are connected by means of movable arms on which the ends of both springs are attached. For this reason, this spring arrangement can be advantageously employed only on such vehicles, on which the back or rear axle is fastened to the frame by special braces, chain-stays or the like, i. e. on vehicles with chain driving. These braces or stays are usually not employed between the front axle and the frame nor on carriages with Cardan-transmission of the movement to the rear axle between the latter and the frame. In this case there would be an oscillating or rocking movement of the unbraced axle relative to the frame, when a horizontal thrust or shock is imparted to the axle. Now in order that the new spring-contrivance may be employed also for the front axle and for vehicles with Cardan driving, only one end of the bearing-spring is, according to the present invention, connected with the suppression-spring.

Figure 1:
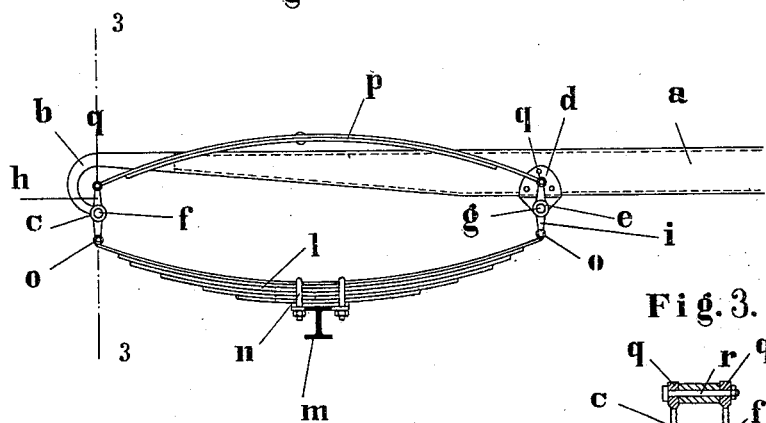
Figure 3:
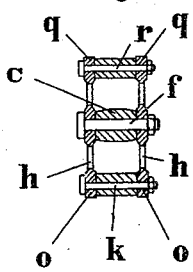
Figure 2:
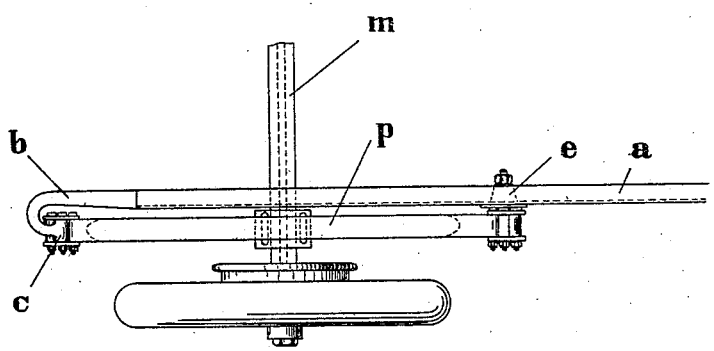
Figure 4:
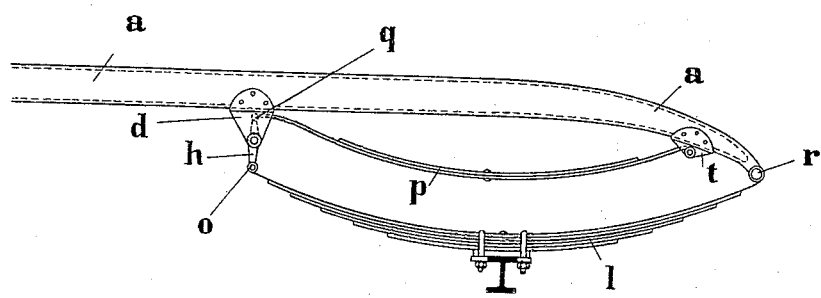
Figure 5:
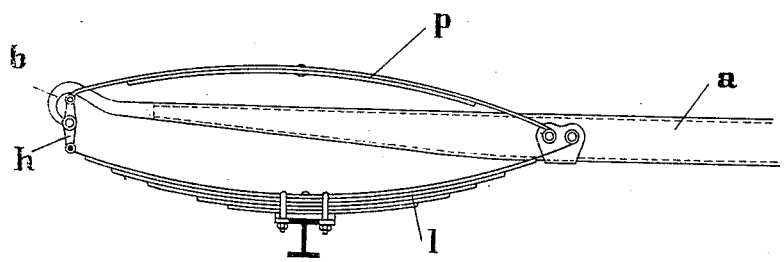

On sheet I of the accompanying drawings, the first form of execution for the attainment of the object of the invention as applied to chain carriages is represented, namely: Figure 1 shows a side view. Fig. 2 shows a plan view. Fig. 3 shows a section on line 3—3 in Fig. 1. Sheet II of the drawing shows forms of execution of the latter kind, without chain-stays namely: Fig. 4 shows a side view of the spring arrangement for the front axle, and Fig. 5 shows a similar side view of the springs for a vehicle with Cardan driving.

$a$ indicates one of the frame longitudinal girders, the back end of which is bent round to form a bearing-arm $b$, which is provided with an eye $c$. On the elbow $d$ fastened on the girder $a$ is a corresponding eye $e$. In the eyes $c$ and $e$, double-armed levers $h$ and $i$ are movably fitted by means of bolts $f$ or $g$. Between the ends $o$ of these double-armed levers the bearing spring $l$ is stretched and linked on the same by means of bolts $k$ (see Fig. 3). The bearing-spring $l$, consisting of a single spring, or, a number of spring-plates laid upon each other, is rigidly connected with the carriage-axle $m$ by means of screw bolts $n$ or the like. By means of the arrangement of the usual chain-stays (not shown) between the wheel-axle and the frame-support, the vertical-guiding or movement of the wheel-axle is attained, so that a lateral swaying of the same is impossible. Between the upper end $g$ of the double-armed levers $h$ and $i$, a second weaker spring-plate $p$ is stretched flexibly by means of bolts $r$; this spring-plate may be shorter than the bearing-spring $l$ and is bent reversely to the latter.

The operation of the contrivance is the following: The bearing-spring $l$, as it receives a jerk or shock is pressed upward and extended, so that the ends of the same are pushed outward, and the ends $o$ of the arms $h$ and $i$ try to turn outward. The upper ends $g$ of the arms $h$ and $i$ make in consequence, an opposite turning movement, whereby the spring $p$ is pressed inward and bent. When the pressure against the bearing-spring $l$ ceases, a movement of the arms $h$ and $i$ and an extension of the spring $p$ take place in the opposite direction. The swaying of the bearing-spring $l$ is always suppressed by the spring $p$, so that the swaying is not transmitted to the carriage-frame, and an exceedingly smooth and quiet running of the carriage is attained.

In the form of execution according to Fig. 4, which is to be employed with a front axle, one end of the bearing-spring $l$ is linked by means of a bolt to the chassis support $a$. The other end of the spring is linked to one end $o$ of a double armed lever $h$ which is pivotally mounted on an elbow $d$ fastened on the frame support $a$. The other end $g$ of the arm $h$ is connected with the one end of a second spring $p$ curved in the same manner as the bearing-spring $l$, the other end of the spring $p$ is fastened to an eye of a second elbow $t$ fixed on the support $a$.

The form of execution in Fig. 5, which is designated for the rear-wheel axle, is distinguished from the above-described form of execution inasmuch as that the movable double-arm $h$ is hung on an eye of the end of the chassis-support $a$ bent round to form a bearing-lever $b$ and the suppression spring $p$, as in the execution shown in Figs. 1-3, is curved reversely to the bearing-spring $l$.

What I claim as my invention is:

1. A spring for vehicles comprising an upper and a lower leaf spring said springs being independent of each other, a vertical two armed lever pivoted to the vehicle body, and means for securing one of the ends of each spring to said two-armed lever, substantially as described.

2. A spring for vehicles comprising a lower leaf spring resting on the axle, a vertical two-armed lever pivoted to the vehicle body, one end of said two-armed lever being connected to one end of the said spring, a second leaf spring independent of the first spring and having one end secured to the other end of the two-armed lever, and means for securing the other ends of the springs to the vehicle, substantially as described.

In witness whereof I have hereunto signed my name this ninth day of October 1908, in the presence of two subscribing witnesses.

JULIUS ROSEMEYER.

Witnesses:
HENRY HASPER,
WOLDEMAR HAUPT.